(12) United States Patent
Lindberg et al.

(10) Patent No.: US 11,822,516 B2
(45) Date of Patent: *Nov. 21, 2023

(54) COMPRESSION TECHNIQUES FOR VERTICES OF GRAPHIC MODELS

(71) Applicant: Apple Inc., Cupertino, CA (US)

(72) Inventors: Lars M. Lindberg, Bjaerred (SE); Ali Sazegari, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/936,805

(22) Filed: Sep. 29, 2022

(65) Prior Publication Data

US 2023/0090310 A1 Mar. 23, 2023

Related U.S. Application Data

(63) Continuation of application No. 16/692,840, filed on Nov. 22, 2019, now Pat. No. 11,461,275.

(60) Provisional application No. 62/855,812, filed on May 31, 2019.

(51) Int. Cl.
| | |
|---|---|
| *G06F 16/00* | (2019.01) |
| *G06F 16/174* | (2019.01) |
| *G06F 16/23* | (2019.01) |
| *G06T 9/00* | (2006.01) |
| *G06F 7/523* | (2006.01) |
| *G06F 7/556* | (2006.01) |
| *G06F 7/499* | (2006.01) |

(52) U.S. Cl.
CPC ...... *G06F 16/1744* (2019.01); *G06F 16/2365* (2019.01); *G06F 7/49947* (2013.01); *G06F 7/523* (2013.01); *G06F 7/556* (2013.01); *G06T 9/001* (2013.01)

(58) Field of Classification Search
CPC ............ G06F 16/1744; G06F 16/2365; G06F 7/49947; G06F 7/523; G06F 7/556; G06T 9/001
USPC .................................................. 707/600–899
See application file for complete search history.

(56) References Cited

U.S. PATENT DOCUMENTS

| | | | | |
|---|---|---|---|---|
| 9,478,002 | B2 * | 10/2016 | Yang | ...................... H04N 19/50 |
| 10,694,210 | B2 * | 6/2020 | Chou | ................... H04N 19/124 |
| 2012/0188241 | A1 * | 7/2012 | Ahn | ........................ H04N 19/44 |
| | | | | 345/420 |

(Continued)

*Primary Examiner* — Michelle N Owyang
(74) *Attorney, Agent, or Firm* — DICKINSON WRIGHT RLLP

(57) ABSTRACT

Methods for lossy and lossless pre-processing of image data. In one embodiment, a method for lossy pre-processing image data, where the method may include, at a computing device: receiving the image data, where the image data includes a model having a mesh, the mesh includes vertices defining a surface, the vertices including attribute vectors, and the attribute vectors including values. The method also including quantizing the values of the attribute vectors to produce modified values, where a precision of the modified values is determined based on a largest power determined using a largest exponent of the values, encoding pairs of the modified values into two corresponding units of information. The method also including, for each pair of the pairs of the modified values, serially storing the two corresponding units of information as a data stream into a buffer, and compressing the data stream in the buffer.

20 Claims, 11 Drawing Sheets

(56) References Cited

U.S. PATENT DOCUMENTS

| | | |
|---|---|---|
| 2015/0379682 A1 | 5/2015 | Golas et al. |
| 2016/0127746 A1 | 5/2016 | Maurer et al. |
| 2016/0307368 A1 | 10/2016 | Akeley et al. |
| 2017/0237996 A1 | 8/2017 | Schneider |
| 2017/0272095 A1 | 9/2017 | Revell |
| 2018/0249183 A1* | 8/2018 | Lindberg ............... H04N 19/59 |
| 2019/0347072 A1 | 11/2019 | Lo et al. |
| 2020/0210839 A1 | 7/2020 | Lo et al. |
| 2022/0078486 A1* | 3/2022 | Hannuksela ... H04N 21/234345 |

* cited by examiner

Image Data 108

Vertex 201

Attribute Vector 202
Position (x, y, z)

Attribute Vector 202
Texture (u, v)

Attribute Vector 202
Normals ($n_x$, $n_y$, $n_z$)

Step 1 – Quantize each attribute value of the Attribute Vectors using a largest power as the quantization value Quantize(attribute_value) = largest_power x round(attribute_value / largest_power)

- Quantize($2^{-24}$) = 0
- Quantize($2^{-7}$) = 0
- Quantize($2^{-6}$) = $2^{-6}$
- Quantize($1 - 2^{-10}$) = 1.0
- Quantize($1 + 2^{-10}$) = 1.0
- Quantize(2) = 2
- Quantize($4 + 7 \times 2^{-8}$) = $4 + 2 \times 2^{-6}$ = 2.03125
- Quantize($16 + 2^{-6}$) = $16 + 2^{-6}$ Quantized Attribute Values 210

FIG. 2A

Image Data 108

Step 1 – Store a stream of image data in memory in interleaved order x_0, y_0, z_0, x_1, y_1, z_1, x_2, y_2, z_2, ..., x_N, y_N, z_N Step 2 – De-interleave the stream of image data into respective streams of data for each attribute value

- Stream x: x_0, x_1, x_2, ..., x_N
- Stream y: y_0, y_1, y_2, ..., y_N
- Stream z: z_0, z_1, z_2, ..., z_N Attribute Value Streams 402

Step 3 – Encode each stream into respective LSB and MSB streams, e.g., :

COMPRESSION TECHNIQUES FOR VERTICES OF GRAPHIC MODELS

CROSS-REFERENCE TO RELATED APPLICATIONS

The present application is a continuation of U.S. patent application Ser. No. 16/692,840, entitled "COMPRESSION TECHNIQUES FOR VERTICES OF GRAPHIC MODELS," filed Nov. 22, 2019, set to issue Oct. 4, 2022 as U.S. Pat. No. 11,461,275, which claims the benefit of U.S. Provisional Application No. 62/855,812, entitled "COMPRESSION TECHNIQUES FOR VERTICES OF GRAPHIC MODELS," filed May 31, 2019, the contents of which are incorporated by reference herein in their entirety for all purposes.

FIELD OF INVENTION

The embodiments described herein set forth techniques for compression, and in particular, techniques for compressing vertices of graphics models.

BACKGROUND

Image compression techniques involve exploiting aspects of an image to reduce its overall size while retaining information that can be used to re-establish the image to its original (lossless) or near-original (lossy) form. Different parameters can be provided to compressors to achieve performance characteristics that best-fit particular environments. For example, higher compression ratios can be used to increase the amount of available storage space within computing devices (e.g., smart phones, tablets, wearables, etc.), but this typically comes at a cost of cycle-intensive compression procedures that consume correspondingly higher amounts of power and time. On the contrary, cycle-efficient compression techniques can reduce power and time consumption, but this typically comes at a cost of correspondingly lower compression ratios and amounts of available storage space within computing devices.

Three-dimensional (3D) computer graphics models used by computing devices include image data that is growing larger and more detailed, and thus, require more storage space. A 3D computer graphics model, or shape, is defined by its two-dimensional (2D) surface, which in turn is specified by a mesh, for example, a triangular or quadrilateral mesh. The mesh is composed of vertices that have several attributes for position, texture, and normals. The vertex attributes may constitute a significant part of the overall size of these models. Storing the vertex attributes in a compressed and memory efficient way may be desired.

SUMMARY

Representative embodiments set forth herein disclose techniques for compressing vertices of image data of a graphic model. In particular, the techniques involve pre-processing the images (i.e., prior to compression) in a manner that can enhance resulting compression ratios when the images are compressed using lossless compressors.

One embodiment sets forth a method for lossy pre-processing image data for lossless compression of the image data. According to some embodiments, the method can be performed by an image analyzer implemented on a computing device. Initially, the method involves receiving the image data, where the image data comprises a model having a mesh, the mesh comprising a plurality of vertices defining a surface, the plurality of vertices comprising a plurality of attribute vectors, and the plurality of attribute vectors comprising a plurality of values. Next, the method involves quantizing the plurality of values of the plurality of attribute vectors to produce a plurality of modified values, wherein a precision of the plurality of modified values is determined based on a largest power determined using a largest exponent of the plurality of values. Next, the method involves encoding pairs of the plurality of modified values into two corresponding units of information. For each pair of the pairs of the plurality of modified values, the method involves serially storing the two corresponding units of information as a data stream into a buffer. The method involves compressing the data stream in the buffer.

Another embodiments sets for a method for lossless pre-processing image data for lossless compression of the image data. According to some embodiments, the method can be performed by an image analyzer implemented on a computing device. Initially, the method involves receiving the image data, where the image data comprises a model having a mesh, the mesh comprising a plurality of vertices defining a surface, the plurality of vertices comprising a plurality of attribute vectors, and the plurality of attribute vectors comprising a plurality of values. Next, the method involves, for each attribute vector of the plurality of attribute vectors: (i) de-interleaving one or more respective attribute values into a respective set of bits; (ii) encoding a first portion of the respective set of bits into a first byte stream comprising (1) a first group of least significant bits, and (2) a sign bit; (iii) encoding a second portion of the respective set of bits into a second byte stream comprising a second group of most significant bits; and (iv) for each of the respective set of bits, concatenating the second byte stream after the first byte stream in a single data stream. The method also involves compressing the single data stream.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the present disclosure will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 2A-2C illustrate a sequence of conceptual diagrams for lossy pre-processing image data for lossless compression, according to some embodiments.

DETAILED DESCRIPTION

Figure 1A:
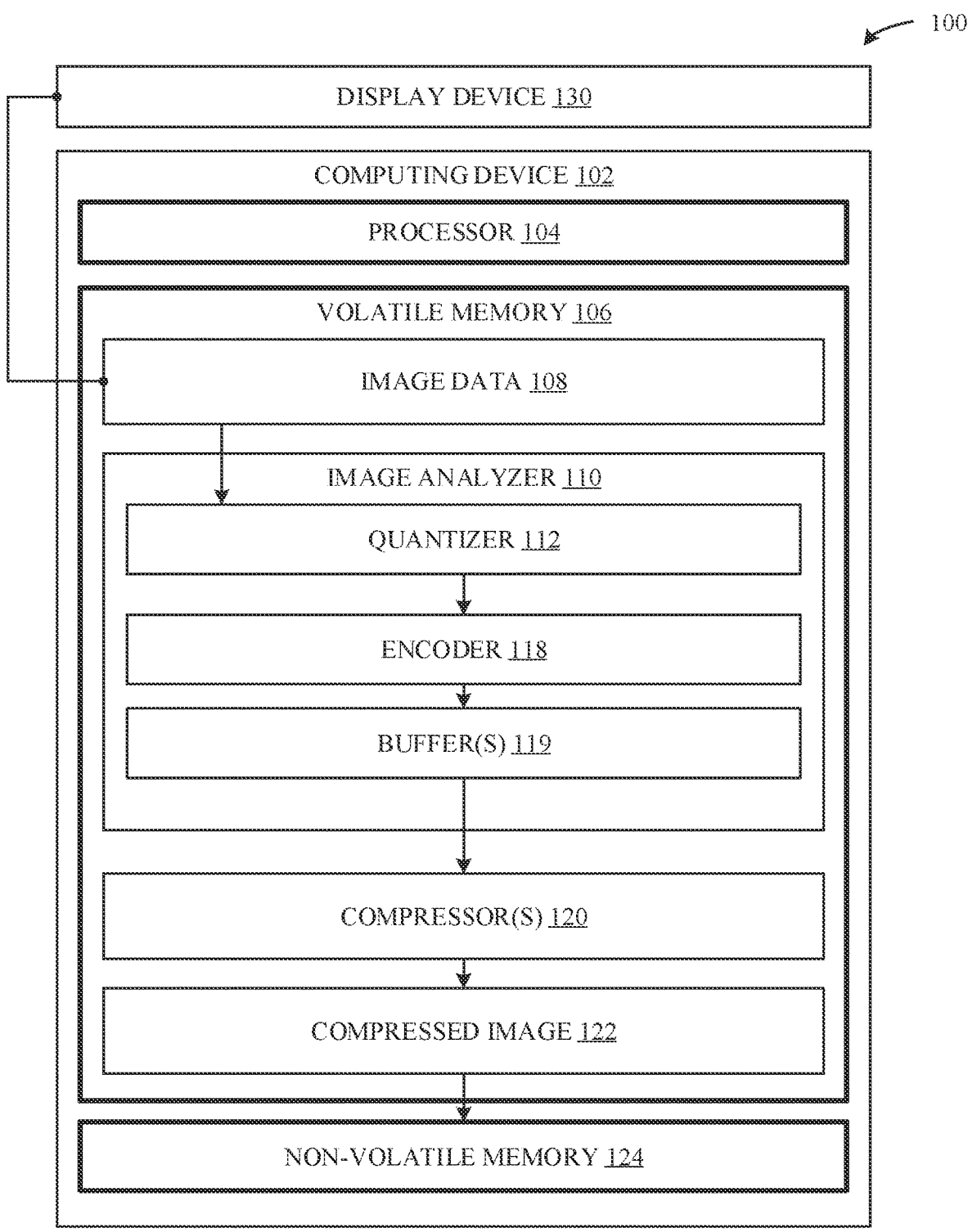
FIGS. 1A-1B illustrates an overview of computing devices that can be configured to perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

The embodiments described herein set forth techniques for compressing image data of 3D computer graphics models. The 3D computer graphics model, or shape, is defined by its 2D surface, which in turn is specified by a mesh, for example, a triangular or quadrilateral mesh. A topology of the mesh may define the vertices of the mesh and how they are connected. For example, various connections between the vertices may define a face and the faces may be connected to define a shape of the model. The information pertaining to vertex connections may be stored in a graph. The vertices of the mesh have several attributes and the present disclosure pertains to the compression of the vertex positions and texture coordinates of these attributes. As noted above, it is of interest to store the vertex attributes in a compressed and memory efficient way. At the same time, it is desirable for compressed formats to be both sufficiently accurate and efficient to decode to not degrade the visual appearance and the initial render speed, respectively. The techniques disclosed herein may achieve reducing the amount of memory used to store the vertex attributes, as well as producing efficient decoding and rendering speed.

In 3D graphics models, the vertex positions and texture coordinates may be represented as three-element and two-element vectors of floating-point numbers, denoted as float3 and float2 for 32-bit single-precision numbers, respectively. In computer graphics, the vertex positions and texture coordinates may also be represented and processed as half-precision, 16-bit floating-point numbers, since such numbers are supported by modern graphics processing units (GPUs). Regarding half-precision floating-point numbers, the numerical precision may be defined by the distance, or interval, between two consecutive numbers. The precision is a fixed-size within a range given by the power determined by raising a base with an exponent. The vertex position vector and texture coordinate vector may be denoted a half3 and half2, respectively.

In some instances, base 3D graphics models may represent digital avatars, characters, animals, people, and so forth. In some embodiments, the 3D graphics models may be emojis or animojis. The base 3D graphics models may be stored on a computing device (e.g., smartphone, tablet, laptop). Initial attribute vectors for the base 3D graphics models may be compressed according to embodiments disclosed herein and stored with the base 3D graphics models. A user may generate a recording that causes the base 3D graphics model to move (e.g., according to their facial expressions). The movements may be captured as relative attribute vectors that describe the displacement of the vertices of the mesh during the recording. These relative attribute vectors may describe how the vertices representing features, such as ears, eyes, mouth, and/or nose, of the 3D graphics model should move. These attribute vectors may be compressed according to embodiments described herein. The compressed relative attribute vectors may be stored on the computing device.

In some embodiments, the user may desire to send the recorded movement of the 3D graphic model to another computing device of another user. The computing device may transmit the relative attribute vectors for the 3D graphics model, among other data, to the other computing device. The other computing device may store initial attribute vectors of the 3D graphic model. Upon receiving the relative attribute vectors, the other computing device may animate the 3D graphic model based on the differences between the initial attribute vectors and the relative attribute vectors.

Some embodiments of the present disclosure provide for a compressor for the half-precision attribute vectors to enable reducing the memory footprint, and to increase decoding and initial rendering. The disclosed embodiments support both lossless compression and a lossy quantization option. Both techniques are based on a first pre-processing step, which may be lossy or lossless, and a second lossless compression (e.g., Lempel-Ziv-Welch (LZW)-based and/or entropy-based compressors). In particular, the techniques involve pre-processing the images (i.e., prior to compression) in a manner that can enhance resulting compression ratios when the images are compressed using lossless compressors (e.g., Lempel-Ziv-Welch (LZW)-based compressors).

According to some embodiments, the techniques described herein can be performed by an image analyzer implemented on a computing device. Initially, the image analyzer receives image data to be compressed. The image data may include a model (e.g., 3D graphic model) having a mesh. The mesh may include a set of vertices defining a surface. The set of vertices may include a set of attribute vectors, and the set of attribute vectors may include a set of values. For each vertex, there may be an attribute vector for position (x, y, z), texture (u, v), and normals ($n_x$, $n_y$, $n_z$). There are three elements of the position vectors and they may be denoted as half3 for including three half-precision, 16-bit floating-point numbers. There are two elements of the texture vectors, and they may be denoted as half2 for including two half-precision, 16-bit floating-point numbers.

In the lossy pre-processing embodiment, after the image data is received by an image analyzer, a quantization step may be performed on the set of values included in the set of attribute vectors. The quantization may be adapted to the range of magnitudes (given by the power) of the attribute vectors in the model of the image data in such a way as not to cause visual artifacts. Due to the values of the attribute vectors being represented as floating-point numbers, the absolute precision of the values is dependent on the (absolute) magnitude of the floating-point numbers. Numbers with a small magnitude (e.g., small power) may have a numerical precision that is higher than an amount suitable to reduce memory footprint of the vertices without causing visual artifacts. To obtain the same numerical precision across the range of values appearing in the set of vectors (e.g., for position and texture), the same precision may be used for those with the highest magnitude. That is, a uniform quantization may be applied where the precision is chosen to match that given by the largest power determined by the largest exponent of the set of values represented as floating-point numbers. The result of the quantization using the largest power as the quantization value on the set of values is a set of modified values (e.g., 12-bit signed integer). Pairs of the set of modified values may be encoded into two corresponding units of information (e.g., a 1 byte least significant bit (LSB) and a 2 byte most significant bit (MSB)) and de-interleaved. For each pair, the two corresponding units of information may be serially stored as a data stream into a buffer. The data stream in the buffer may be compressed using the lossless compressor to obtain a compressed image. The compressed image may be stored in memory and/or transmitted to another computing device.

In the lossless pre-processing embodiment, after the image data is received by an image analyzer, a de-interleaving step may be performed for each attribute vector of the set of attribute vectors to separate the respective attribute vector into respective streams for their respective x, y, and z value and u and v values. Each of the value streams may be further split into a LSB stream and a MSB stream. These LSB streams and MSB streams may be concatenated, one after the other, into a single data stream. The single data stream may be compressed using a lossless compressor to obtain the compressed image. The compressed image may be stored in memory and/or transmitted to another computing device.

Accordingly, the techniques set forth herein involve pre-processing vertices of image data in a manner that can enhance resulting compression ratios when the images are provided to compressors (e.g., LZW-based compressors), thereby enabling computing devices to maintain visually accurate 3D graphic models while reducing the amount of required storage space. A more detailed description of these techniques is provided below in conjunction with FIGS. 1A, 1B, 2A-2C, 3, 4A-4C, 5, and 6.

Figure 6:
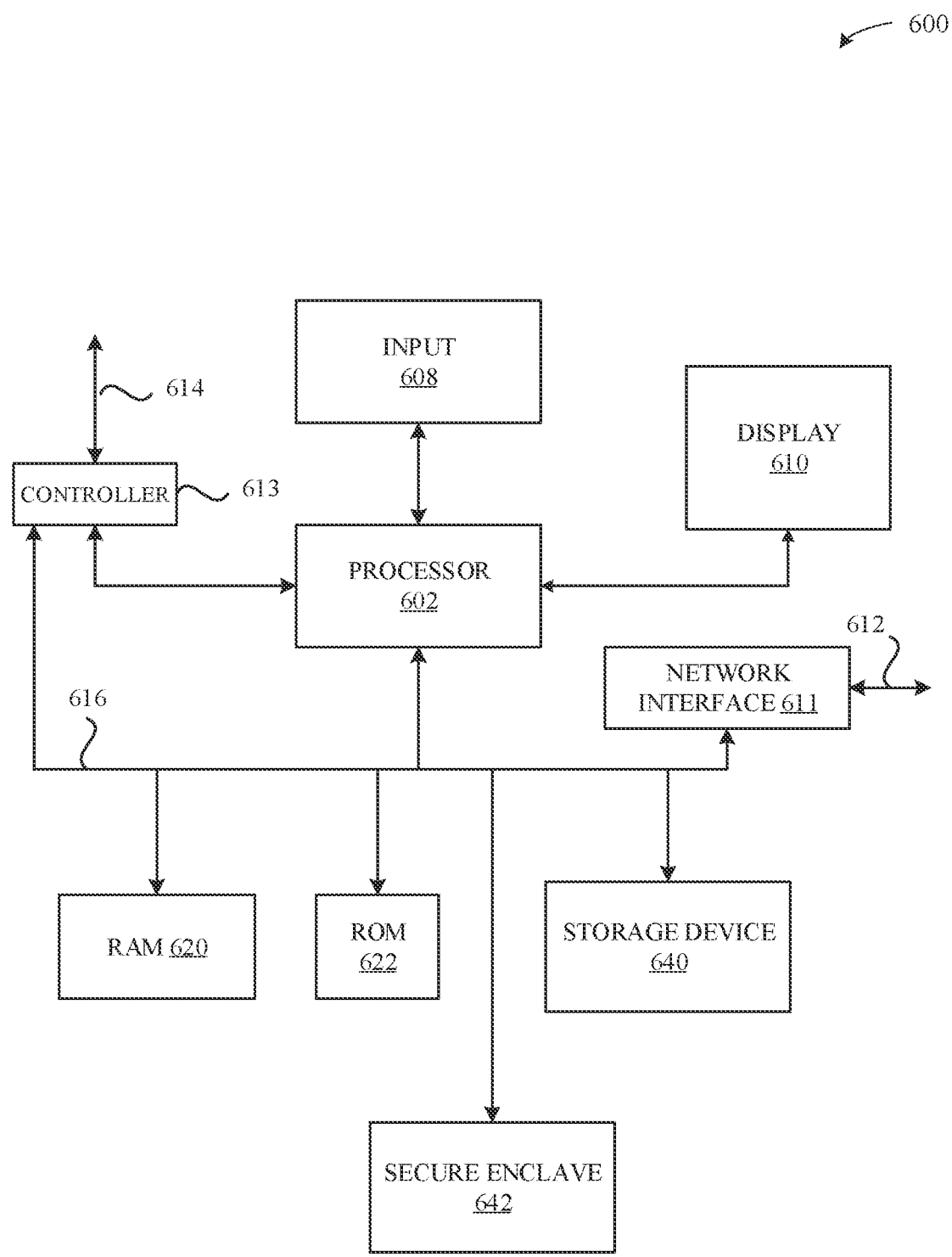
FIG. 6 illustrates a detailed view of a computing device that can be used to implement the various techniques described herein, according to some embodiments.

FIG. 1A illustrates an overview 100 of a computing device 102 that can be configured to perform the various techniques described herein. As shown in FIG. 1A, the computing device 102 can include a processor 104, a volatile memory 106, and a non-volatile memory 124. It is noted that a more detailed breakdown of example hardware components that can be included in the computing device 102 is illustrated in FIG. 6, and that these components are omitted from the illustration of FIG. 1A merely for simplification purposes. For example, the computing device 102 can include additional non-volatile memories (e.g., solid state drives, hard drives, etc.), other processors (e.g., a multi-core central processing unit (CPU)), and so on. According to some embodiments, an operating system (OS) (not illustrated in FIG. 1A) can be loaded into the volatile memory 106, where the OS can execute a variety of applications that collectively enable the various techniques described herein to be implemented. As described in greater detail herein, these applications can include an image analyzer 110 (and its internal components), one or more compressors 120, and so on.

According to some embodiments, the image analyzer 110 can be configured to implement the techniques described herein that involve lossy pre-processing image data 108 prior to compressing the image data 108. In particular, and as shown in FIG. 1A, the image data 108 can correspond to a display device 130 that is communicably coupled to the computing device 102, where the image data 108 includes a 3D graphics model having a mesh. The mesh includes a set of vertices that define a surface. The set of vertices include a set of attribute vectors (e.g., position, texture, etc.), and the set of attribute vectors include a set of values. The values may be half-precision, 16-bit floating-point numbers. The following description of the image analyzer 110 with respect to FIG. 1A is provided at a high level for simplification purposes.

As shown in FIG. 1A, the image data 108 is received by the image analyzer 110. Upon receipt of the image data 108, a quantizer 112 can be configured to quantize each the set of values in the set of attribute vectors to produce a collection of modified pixels, which is described below in greater detail in conjunction with FIG. 2A. As previously noted herein, the quantization of the set of values can represent a "lossy" step in which the overall accuracy of the image data 108 is downgraded, but this can be fine-tuned/minimized by controlling the configuration of the quantizer 112 such that there may not be any visual artifacts that result from the quantization.

Next, the encoder 118 distributes the bits (i.e., binary values) of pairs of the modified values into two corresponding bytes, which is described below in greater detail in conjunction with FIG. 2B. Finally, the corresponding bytes are placed—in a particular order—into a buffer 119 as a data stream, whereupon the compressor(s) 120 compress the data stream to obtain a compressed image, which is described below in greater detail in conjunction with FIG. 2C.

Notably, and according to some embodiments, the compressor(s) 120 can be configured to implement one or more compression techniques for compressing the buffer(s) 119. Moreover, the compressor(s) 120 can be implemented in any manner to establish an environment that is most-efficient for compressing the buffer(s) 119. For example, multiple buffers 119 can be instantiated (where modified pixels can be pre-processed in parallel), and each buffer 119 can be tied to a respective compressor 120 such that the buffers 119 can be simultaneously compressed in parallel as well. Moreover, the same or a different type of compressor 120 can be tied to each of the buffer(s) 119 based on the inherent formatting of the content that is placed into the buffer(s) 119.

Accordingly, FIG. 1A provides a high-level overview of different hardware/software architectures that can be implemented by computing device 102 in order to carry out lossy pre-processing described herein. A more detailed breakdown of these techniques will now be provided below in conjunction with FIGS. 2A-2C and 3.

Figure 1B:
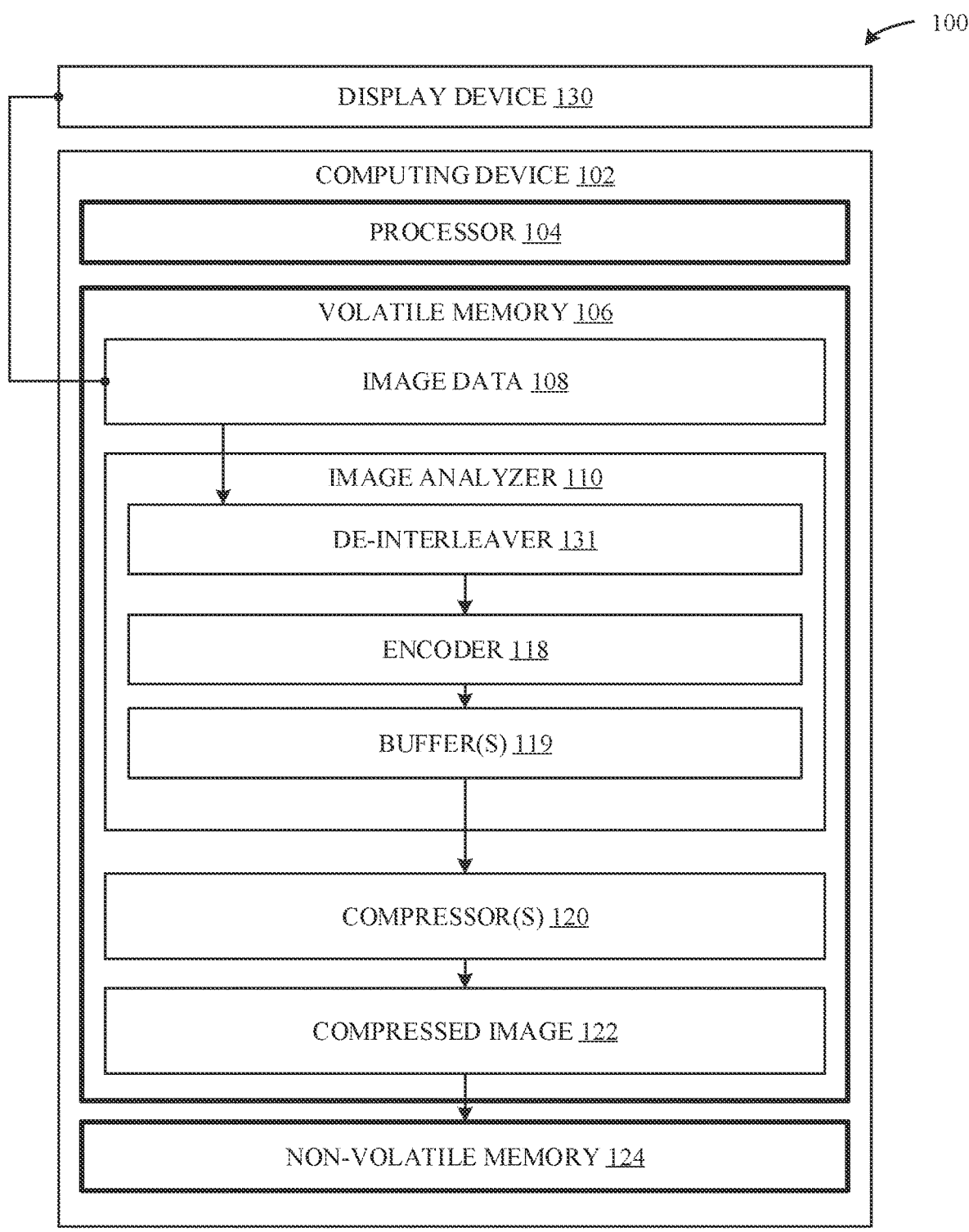

FIG. 1B illustrates an overview 100 of a computing device 102 that can be configured to perform the various techniques described herein. As shown in FIG. 1B, the computing device 102 can includes similar components to the computing device 102 depicted in FIG. 1A. However, according to some embodiments, the image analyzer 110 depicted in FIG. 1B can be configured to implement the techniques described herein that involve lossless pre-processing the image data 108 prior to compressing the image data 108. In particular, and as shown in FIG. 1B, the image data 108 is received by the image analyzer 110. Upon receipt of the image data 108, a de-interleaver 131 can be configured to de-interleave each set of attribute vectors into respective streams of bits for the set of values, which is described below in greater detail in conjunction with FIG. 4A. Next, the encoder 118 distributes each stream of bits (i.e., binary values) into two corresponding streams for LSBs and MSBs, which is described below in greater detail in conjunction with FIG. 4B. Finally, the corresponding bytes are placed—in a particular order— into a buffer 119 as a data stream, whereupon the compressor(s) 120 compress the data stream to obtain a compressed image, which is described below in greater detail in conjunction with FIG. 4C.

Accordingly, FIG. 1B provides a high-level overview of different hardware/software architectures that can be implemented by computing device 102 in order to carry out the lossless pre-processing described herein. A more detailed breakdown of these techniques will be provided below in conjunction with FIGS. 4A-4C and 5.

Figure 2B:
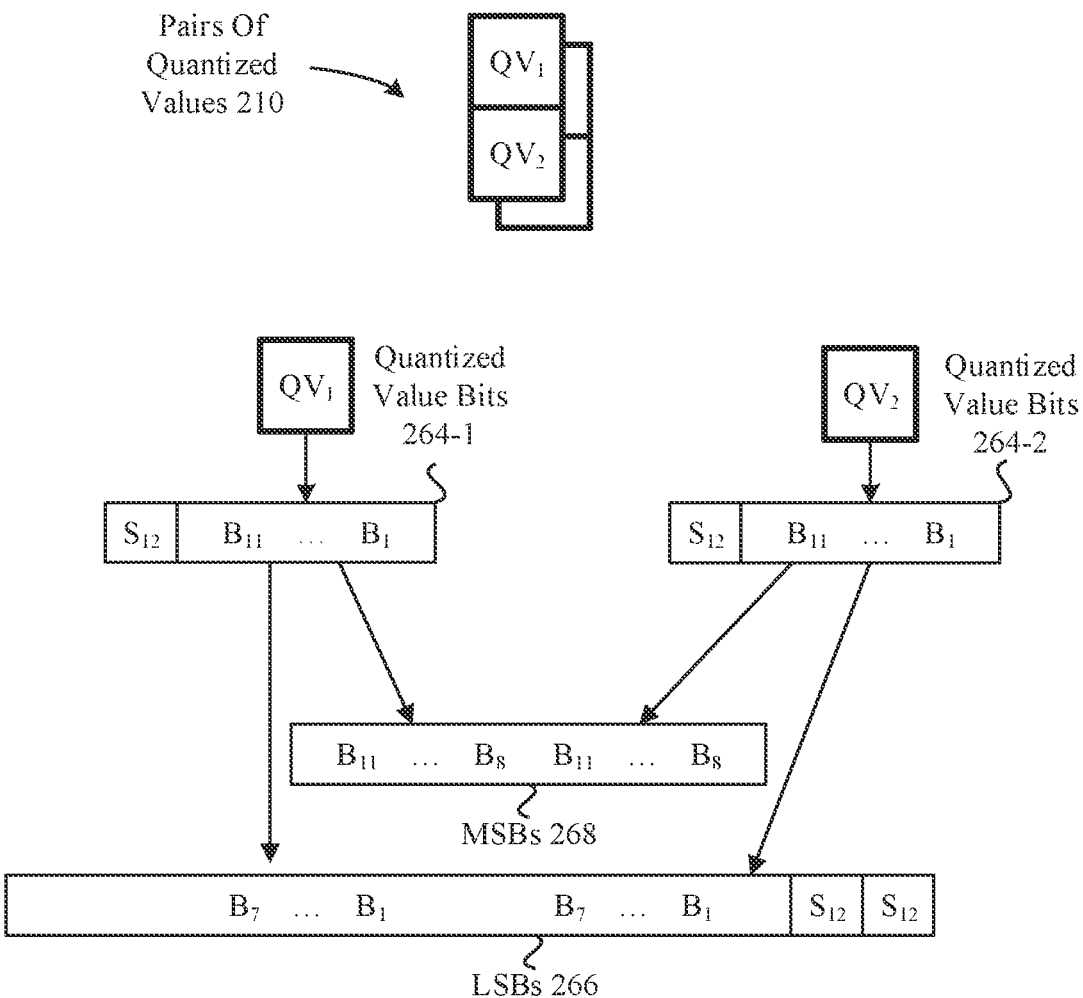
Figure 2C:
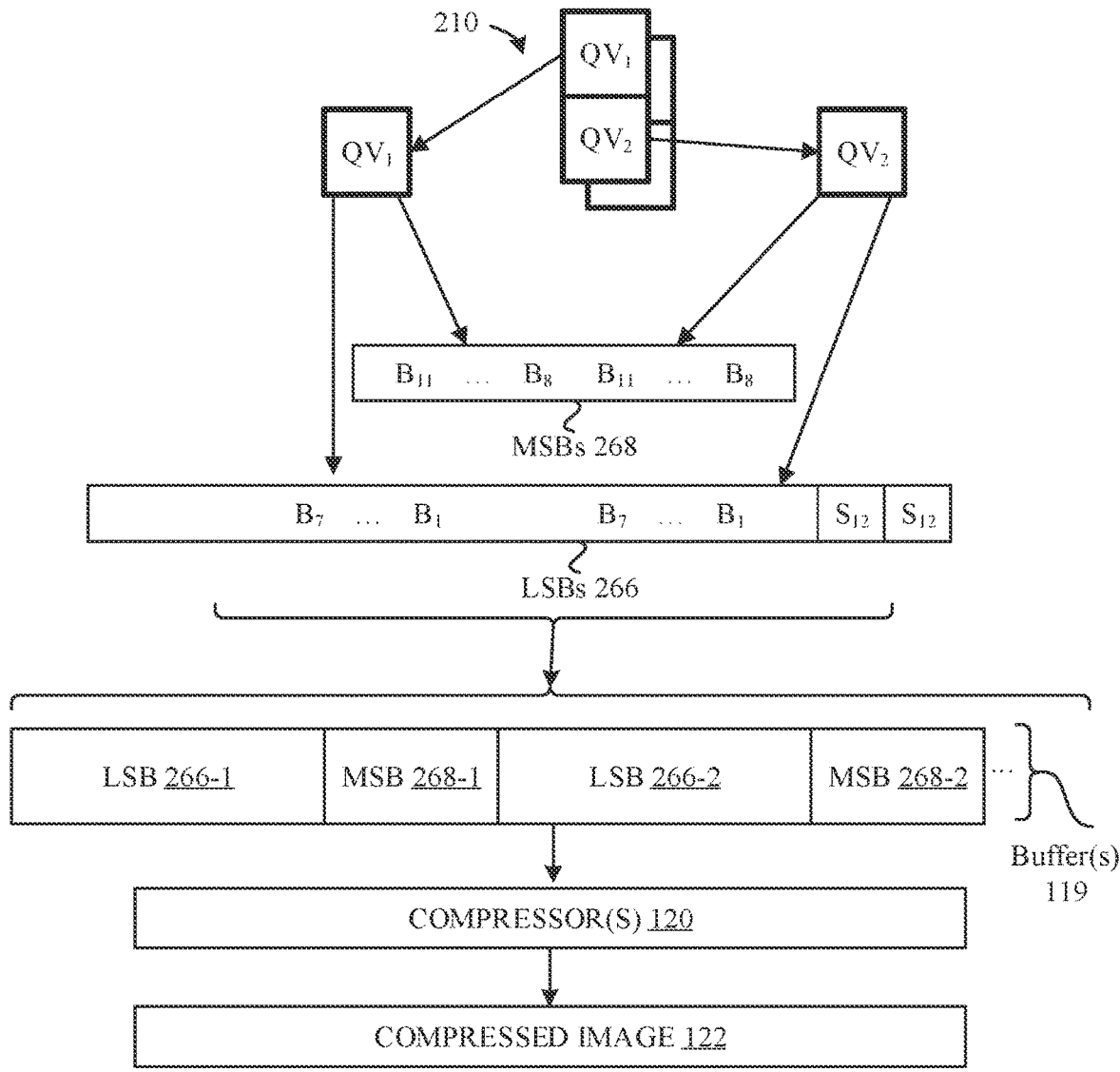

FIGS. 2A-2C illustrate a sequence of conceptual diagrams for lossy pre-processing image data for lossless compression, according to some embodiments. In particular, the conceptual diagrams illustrate a series of steps that the image analyzer 110 can be configured to carry out when pre-processing image data 108 for compression by the compressor(s) 120. For example, FIG. 2A illustrates a conceptual diagram 200 that is implemented by the quantizer 112, according to some embodiments. As shown in FIG. 2A, the image data 108 includes a set of vertices 201 that each include a set of attribute vectors 202. Respective sets of attribute vectors 202 include a set of values for each of position coordinates (x, y, z), textures (u, v), and/or normals ($n_x$, $n_y$, $n_z$).

A base is raised to an exponent to result in a number referred to as a power. The following relationship depicts how a power is determined:

$$base\char`^exponent=power$$

As noted above, the conceptual diagram 200 illustrates how the quantizer 112 can execute a first step, Step 1, that involves quantizing each attribute value of the set of attribute values included in the set of attribute vectors using a largest power as a quantization value. That is, the quantizer 112 may first identify a largest exponent of the set of attribute values. The quantizer 112 may then determine a largest power using the largest exponent. For example, the quantizer 112 may use the following relationship to determine the largest power:

$$largest\_power=2\char`^(largest\_exponent)$$

The quantizer 112 may use the largest power as the quantization value to perform uniform quantization of the set of values included in each of the attribute vectors. The quantizer 112 may use the following relationship to quantize the set of attribute values into modified values:

$$Quantize(attribute\_value)=largest\_power \times round(attribute\_value/largest\_power)$$

As depicted by the relationship, each attribute value may be divided by the largest power and rounded, and the rounded value may be multiplied by the largest power to obtain the modified value 210. For example, it may be understood that the largest exponent in FIG. 2A is −6 and the largest power in FIG. 2A is $2^{-6}$. The attribute values depicted include $2^{-24}$, $2^{-7}$, $2^{-6}$, $1-2^{-10}$, $1+2^{-10}$, 2, $4+7*2^{-8}$, and $16+2^{-6}$. The attribute values may be quantized using the relationship described above. Quantizing $2^{-24}$ results in 0, quantizing $2^{-7}$ results in 0, quantizing $2^{-6}$ results in $2^{-6}$, quantizing $(1-2^{-10})$ results in 1.0, quantizing $(1+2^{-10})$ results in 1.0, quantizing 2 results in 2, quantizing $(4+7*2^{-8})$ results in $4+2\times 2^{-6}=4.03125$, and quantizing $(16+2^{-6})$ results in $16+2^{-6}$.

It is noted that the quantizer 112 can be configured in any manner to accommodate additional types of image data 108 having different resolutions, layouts, bit-depths, and so on, without departing from the scope of this disclosure. When the quantizer 112 completes the quantization of the set of values, the values are replaced with quantized modified values 210, as illustrated in FIG. 2A. Each modified value may be a 12-bit signed integer.

Turning now to FIG. 2B, the conceptual diagram 260 illustrates how the encoder 118 can execute a second step, Step 2, that involves performing an encoding operation against the set of pairs of modified values 210. As shown in FIG. 2B, each modified value bits QV1 and QV2 can be a 12-bit signed integer 264-1 and 264-2, respectively, each including a sign bit S12 and 11 bits (B11 to B1).

Next, the encoder 118 can be configured to separate each of the modified value bits QV1 and QV2 into respective two corresponding bytes: least significant bytes (LSBs) 266 and most significant bytes (MSBs) 268. The encoder 118 can perform this operation using a variety of approaches, e.g., performing an in-place modification of the modified value bits QV1 and QV2 264 (and ordered according to the distribution illustrated in FIG. 2B), copying the modified value bits QV1 and QV2 264 to respective data structures for the MSBs 268 and the LSBs 266 (and ordered according to the distribution illustrated in FIG. 2B), and so on. In any case, as shown in FIG. 2B, the LSBs 266 can be configured to store (1) the least significant bits ($B_7$ to $B_1$) of each of the modified value bits QV1 and QV2 264, and (2) the sign bits (S12) of the corresponding modified value bits QV1 and QV2 264. Moreover, the MSBs 268 can be configured to store the most significant bits ($B_{11}$ to $B_8$) of the corresponding modified value bits QV1 and QV2 264. The LSB 266 data structure may be two bytes that holds 16 bits (B7 to B1 of QV1, B7 to B1 of QV2, and S12 for both QV1 and QV2). The MSB 268 data structure may be one byte that holds 8 bits (B11 to B8 of QV1 and B11 to B8 of QV2). The modified value bits for each pair of a set of pairs of modified values may be stored in respective LSBs 266 and MSBs 268 in a similar fashion to as described above.

Finally, turning now to FIG. 2C, the conceptual diagram 280 illustrates how the encoder 118 can execute a third step, Step 3, that involves finalizing the encoding operation illustrated in FIG. 2B. As shown in FIG. 2C, the LSBs 266/MSBs 268 for each pair of the set of pairs of modified values 210 can be provided to buffer(s) 119 (e.g., as a data stream) according to a particular order. In particular, the LSBs 266-1 that correspond to a first pair of modified values take the first position in the buffer(s) 119, followed by the MSBs 268-1 that correspond to the first pair of modified values, followed by the LSBs 266-2 that correspond to a second pair of modified values, followed by MSBs 268-2 that correspond to the second pair of modified values. In turn, the compressor(s) 120 can take action (e.g., when the buffer(s) 119 are filled with data) and compress the contents of the buffer(s) 119 to produce a compressed output (e.g., compress image 122). In some embodiments, the compressed outputs may be joined together to produce a compressed image 122.

Figure 3:
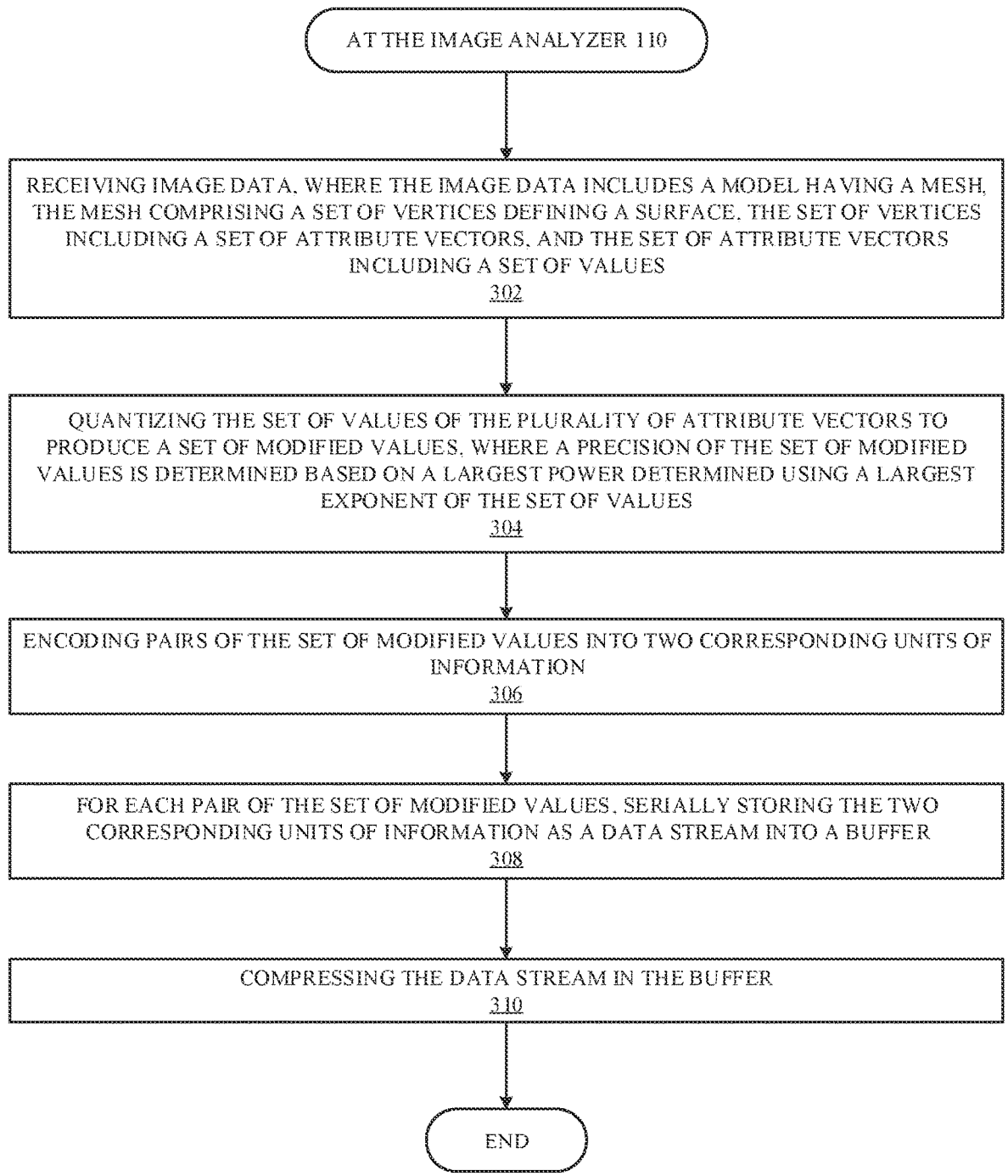
FIG. 3 illustrates a method for lossy pre-processing image data for lossless compression, according to some embodiments.

FIG. 3 illustrates a method 300 for lossy pre-processing image data for lossless compression of the image data, according to some embodiments. As shown in FIG. 3, the method 300 begins at step 302, where the image analyzer 110 receives image data that includes a model having a mesh, the mesh including a set of vertices defining a surface, the set of vertices including a set of attribute vectors, and a set of attribute vectors including a set of values. The set of attribute vectors may include a set of position vectors and a set of texture vectors. Each value of the set of values may be a 16-bit floating-point number including a sign bit, 5-bits of exponent representing range, and 11-bits of significand representing accuracy.

At step 304, the image analyzer 110—specifically, the quantizer 112—quantizes the set of values of the set of attribute vectors to produce a set of modified values. The quantizer 112 may quantize each value of the set of values individually. Each modified value may include a 12-bit signed integer plus the largest exponent, and the set of modified values may be stored in an array. A precision of the set of modified values is determined based on a largest power determined using a largest exponent of the set of values. Quantizing the set of values of the set of attribute vectors to produce the set of modified values may include identifying a value of the set of values that has the largest exponent, and determining the set of modified values by applying a largest power determined using the largest exponent to each of the set of values. Determining the set of modified values by applying the largest power to each of the set of values may further include, for each value of the set of values, (i) dividing the value by the largest power to obtain an intermediate value, (ii) rounding the intermediate value to obtain a rounded intermediate value, and (iii) multiplying the rounded intermediate value by the largest power to obtain a modified value. In other words, the following relationship may be used to determine a modified value (quantized value):

$$\text{Quantized}(\text{attribute\_value}) = \text{largest\_power} \times \text{round}(\text{attribute\_value}/\text{largest\_power})$$

The result of the relationship above may be a 12-bit signed integer as the modified value for the attribute value. In some embodiments, quantization may be performed by, for each value of the set of values that are not associated with the largest power, modifying one or more least significant bits of the 11-bits of significand to zero. In some embodiments, for a value of the set of values that is associated with the largest power, the quantizer 112 may quantize the value by setting every other bit of the 11-bits of significand to zero.

At step 306, the image analyzer 110—specifically, the encoder 118—encodes pairs of the set of modified values into two corresponding units of information (e.g., a 1 byte MSB and a 2 byte LSB). Encoding pairs of the set of modified values into two corresponding bytes may include, for each modified value in the pair of the pairs of the set of modified values, (i) placing, into a first unit of information of the two corresponding units of information, least significant bits and a sign bit, and (ii) placing, into a second unit of information of the two corresponding units of information, most significant bits, where the first unit of information includes two bytes and the second unit of information comprises one byte.

At step 308, for each pair of the pairs of the set of modified values, the image analyzer 110 serially stores the two corresponding units of information as a data stream into a buffer (e.g., as described above in Step 3 of FIG. 2C). Finally, at step 310, the compressor(s) 120 compress the data stream in the buffer, where the output of the compressed data stream is a compressed image 122 (e.g., as also described above in Step 3 of FIG. 2C). The data stream may be compressed in accordance with a Lempel-Ziv-Welch ("LZW")-type or entropy-type compressor.

In some embodiments, second image data may be received (by a processor) that includes one or more relative attribute vectors associated with one or more of the set of vertices of the mesh of the image data 108, where the one or more relative attribute vectors include one or more second values. The data stream may be decompressed and the set of modified values may be returned to the set of values using the largest power. Differences between the one or more second values and corresponding one or more of the set of values may be determined. The model may be animated on a display device 130 based on the differences.

Figure 4A:
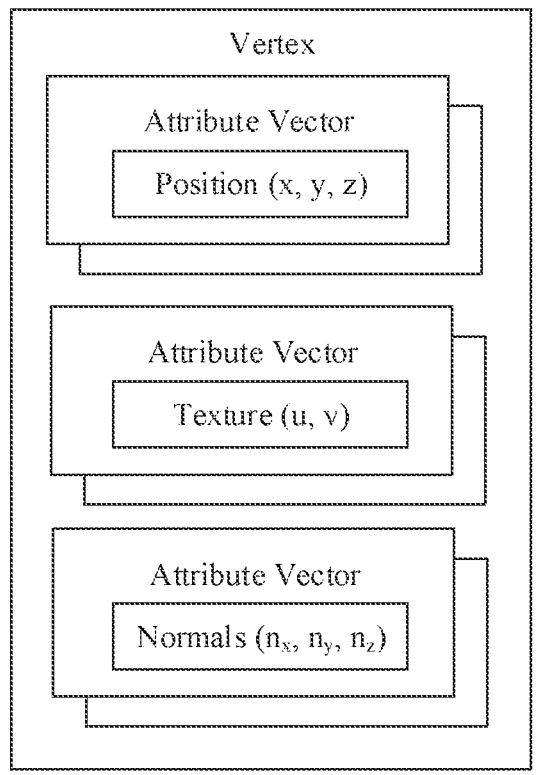
FIGS. 4A-4C illustrate a sequence of conceptual diagrams for lossless pre-processing image data for lossless compression, according to some embodiments.
Figure 4B:
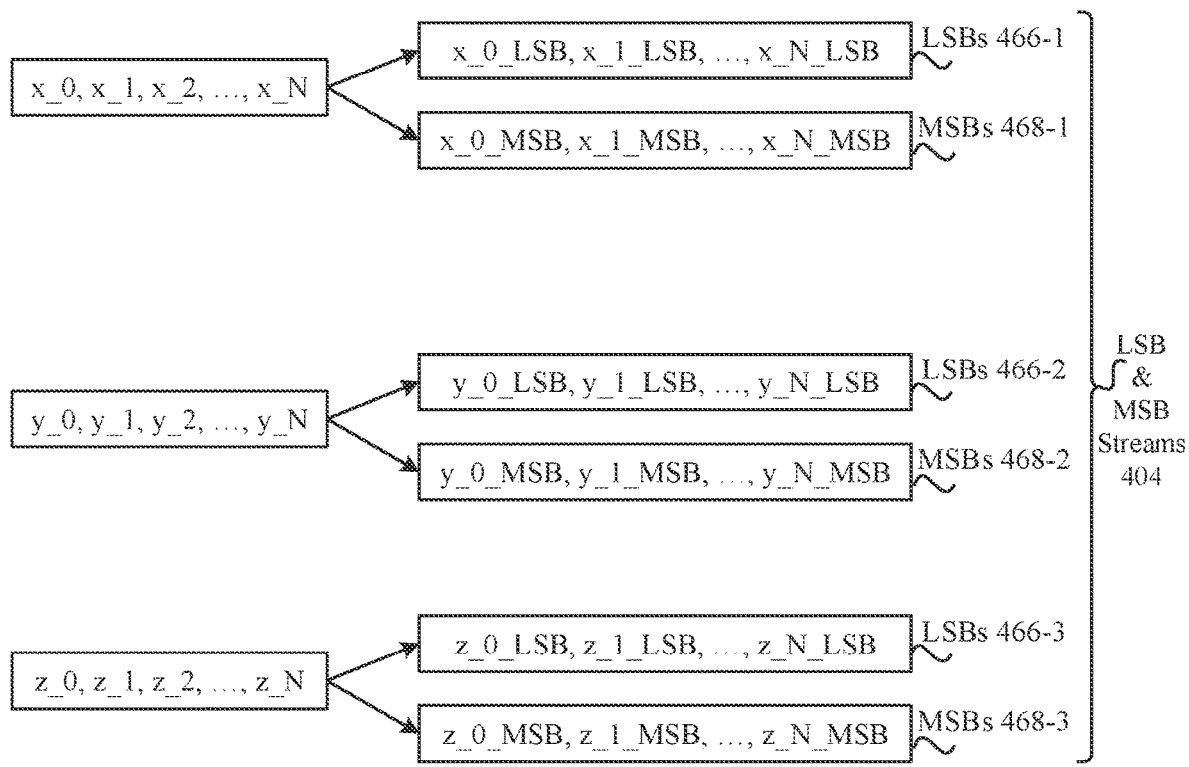
Figure 4C:
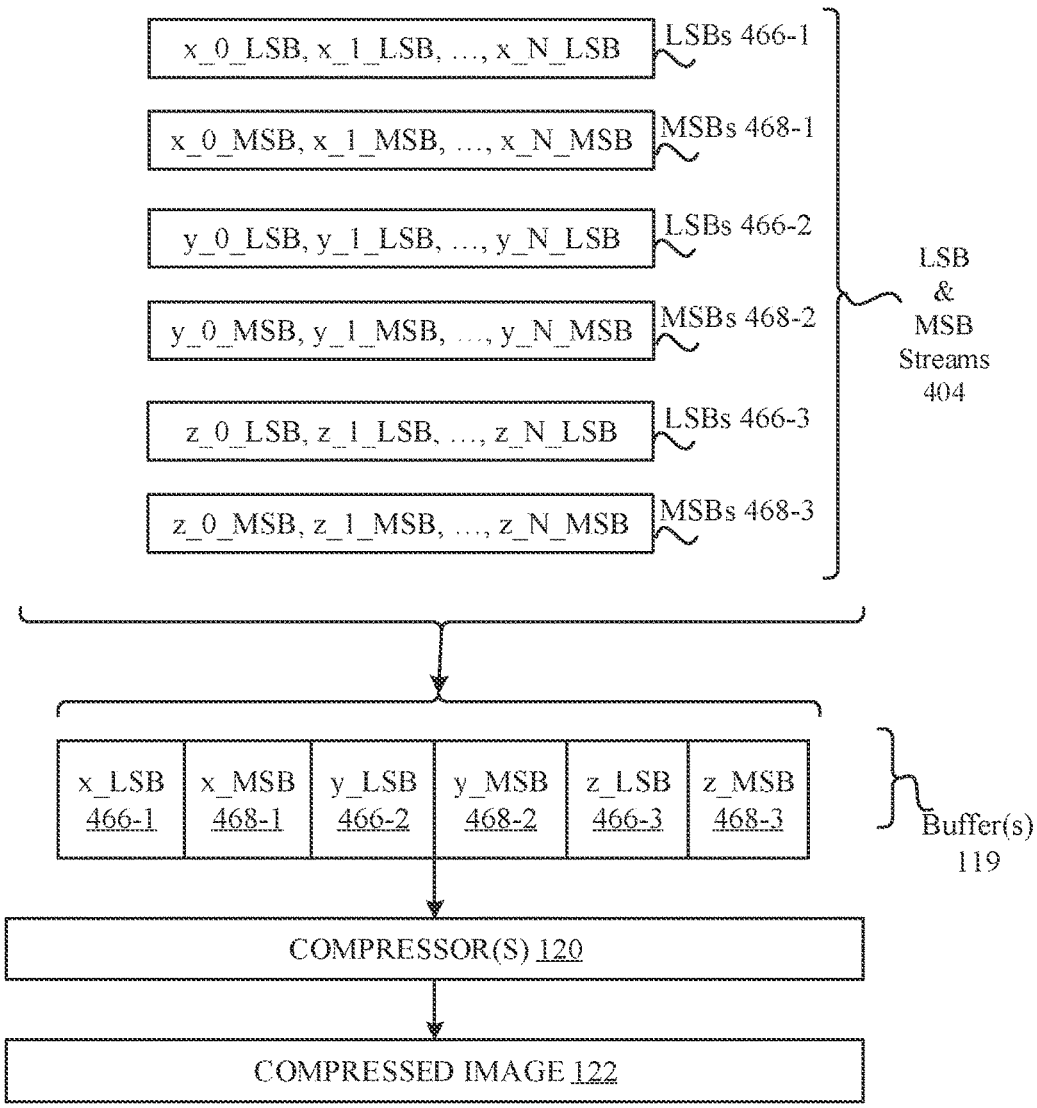

FIGS. 2A-2C and method 300 of FIG. 3 pertained to lossy pre-processing image data for lossless compression, according to some embodiments. FIGS. 4A-4C and method 500 of FIG. 5 below pertain to lossless pre-processing image data for lossless compression, according to some embodiments. In particular, the conceptual diagrams in FIGS. 4A-4C illustrate a series of steps that the image analyzer 110 can be configured to carry out when pre-processing image data 108 for compression by the compressor(s) 120.

For example, FIG. 4A illustrates a conceptual diagram 400 that is implemented by the image analyzer 110, according to some embodiments. As shown in FIG. 4A, the image data 108 includes a set of vertices 201 that each include a set of attribute vectors 202. Respective sets of attribute vectors 202 include a set of values for each of position coordinates (x, y, z), textures (u, v), and/or normals ($n_x$, $n_y$, $n_z$).

As noted above, the conceptual diagram 400 illustrates how the image analyzer 110 can execute a first step, Step 1, which involves receiving a stream of image data 108 and storing it in an interleaved order in memory. The attribute values may be received in an interleaved order for each attribute vector in the image data 108. For example, the raw data for (x, y, z) coordinates may be mixed in a single stream (e.g., 1 dimensional buffer/array with 3x(N+1) 16-bit values and stored in memory in the following order:

$x\_0, y\_0, z\_0, x\_1, y\_1, z\_1, x\_2, y\_2, z\_2, \ldots, x\_N, y\_N, z\_N$ Here, x_k refers to the x-coordinate of the k:th vector, which is a 16-bit number in half-precision floating point format. The k:th vector is (x_k, y_k, z_k). The conceptual diagram 400 illustrates how the de-interleaver 131 can execute a second step, Step 2, which involves de-interleaving each attribute value of the set of attribute values included in the set of attribute vectors. For example, for the attribute vector including attributes values for x, y, and z, the de-interleaver 131 may separate the values into three separate streams for the x, y, and z attribute values. For example, and as depicted, the attribute value streams 402 may be generated: stream x (x_0, x_1, x_2, ..., x_N), stream y (y_0, y_1, y_2, ..., y_N), and stream z (z_0, z_1, z_2, ..., z_N).

Next, as depicted in conceptual diagram 410 of FIG. 4B, an encoder 118 may be used to execute step three, Step 3, that involves encoding each attribute value stream 402 into respective LSBs and MSBs streams. That is, a first potion of each attribute value stream 402 may be encoded into a first byte stream including (1) a first group of LSBs, and (2) a sign bit. A second portion of the respective set of bits of each attribute value stream 402 may be encoded into a second byte stream including a second group of MSBs. As depicted, a set of LSBs and MSBs streams 404 may be generated. For the stream x, there is LSBs 466-1 including x_0_LSB, x_1_LSB, ..., x_N_LSB, and MSBs 468-1 including x_0_MSB, x_1_MSB, . . . , x_N_MSB. For the stream y, there is LSBs 466-2 including y_0_LSB, y_1_LSB, . . . , y_N_LSB, and MSBs 468-2 including y_0_MSB, y_1_MSB, . . . , y_N_MSB. For the stream z, there is LSBs 466-3 including z_0_LSB, z_1_LSB, . . . , z_N_LSB, and MSBs 468-3 including z_0 MSB, z_1 MSB, . . . , z_N_MSB.

Finally, turning now to FIG. 4C, the conceptual diagram 430 illustrates how the encoder 118 can execute a third step, Step 3, that involves finalizing the encoding operation illustrated in FIG. 4B. As shown in FIG. 4C, the LSBs 466/MSBs 468 for each attribute value (e.g., x, y, z) can be provided to buffer(s) 119 (e.g., as a data stream) according to a particular order. In particular, for each respective attribute value, the MSBs 268 may be concatenated after the LSBs 266. For example, the buffer 119 includes the following order of LSBs and MSBs streams 404: x_LSB 466-1, x_MSB 468-1, y_LSB 466-2, y_MSB 468-2, z_LSB 466-3, and z_MSB 468-3. In turn, the compressor(s) 120 can take action (e.g., when the buffer(s) 119 are filled with data) and compress the contents of the buffer(s) 119 to produce a compressed output (e.g., compress image 122). In some embodiments, the compressed outputs may be joined together to produce a compressed image 122.

Figure 5:
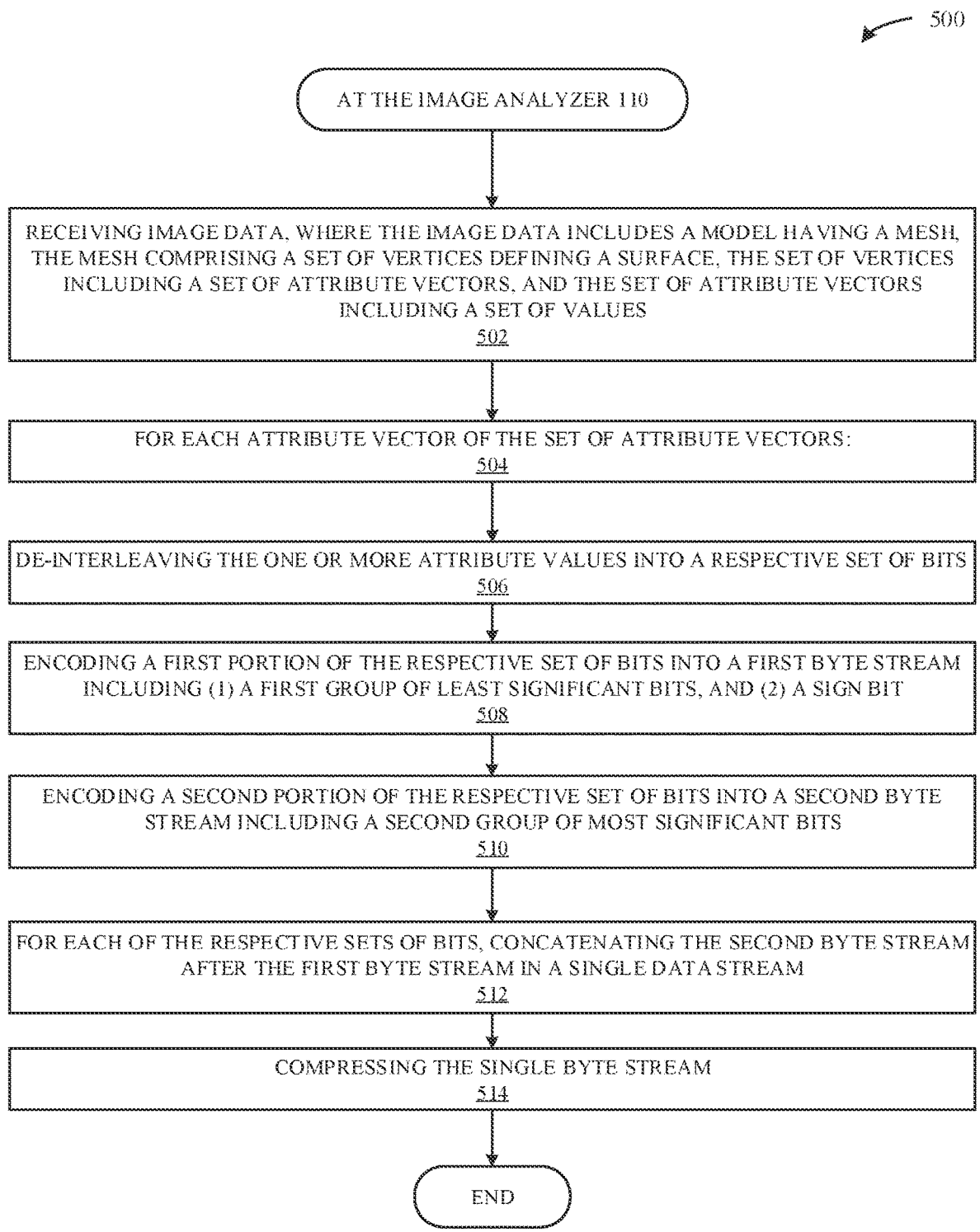
FIG. 5 illustrates a method for lossless pre-processing image data for lossless compression, according to some embodiments.

FIG. 5 illustrates a method 500 for lossless pre-processing image data for lossless compression of the image data, according to some embodiments. As shown in FIG. 5, the method 500 begins at step 502, where the image analyzer 110 receives image data that includes a model having a mesh, the mesh including a set of vertices defining a surface, the set of vertices including a set of attribute vectors, and a set of attribute vectors including a set of values. The set of attribute vectors may include a set of position vectors and a set of texture vectors. Each value of the set of values may be a 16-bit floating-point number including a sign bit, 5-bits of exponent representing range, and 11-bits of significand representing accuracy. The set of attribute vectors may include a position vector and a texture vector, where each of the position vector and the texture vector include one or more half-precision, floating-point numbers. The attribute values may be received in an interleaved order as discussed above with reference to FIG. 4A.

At step 504, for each attribute vector of the set of attribute vectors, the image analyzer 110—specifically, the de-interleaver 131—de-interleaves (step 506) the one or more attribute vectors into a respective set of bits. For example, for the position vector, the de-interleaver 131 may split the x, y, and z attribute values into separate respective streams. Likewise, for the texture vector, the de-interleaver 131 may split the u, and v attribute values into separate respective streams.

At step 508, the image analyzer 110—specifically, the encoder 118—encodes a first portion of the respective set of bits into a first byte stream including (i) a first group of least significant bits and (ii) a sign bit. For example, the encoder 118 may encode the least significant bits of the x coordinates into LSBs 466-1, the least significant bits of the y coordinates into LSBs 466-2, and the least significant bits of the z coordinates into LSBs 466-3, as depicted in FIG. 4B.

At step 510, the image analyzer 110—specifically, the encoder 118—encodes a second portion of the respective set of bits into a second byte stream including a second group of most significant bits. For example, the encoder 118 may encode the most significant bits of the x coordinates into MSBs 468-1, the most significant bits of they coordinates into MSBs 468-2, and the most significant bits of the z coordinates into MSBs 468-3, as depicted in FIG. 4B.

At step 512, for each of the respective sets of bits, the image analyzer 110 concatenates the second byte stream after the first byte stream in a single data stream. The resulting order of the LSB and MSB streams 404 stored in the buffer 119 is depicted in FIG. 4C.

At step 514, the compressor(s) 120 compress the data stream in the buffer, where the output of the compressed data stream is a compressed image 122 (e.g., as also described above in Step 3 of FIG. 4C). The data stream may be compressed in accordance with a Lempel-Ziv-Welch ("LZW")-type or entropy-type compressor.

FIG. 6 illustrates a detailed view of a computing device 600 that can be used to implement the various components described herein, according to some embodiments. In particular, the detailed view illustrates various components that can be included in the computing device 102 illustrated in FIGS. 1A and 1B. As shown in FIG. 6, the computing device 600 can include a processor 602 that represents a microprocessor or controller for controlling the overall operation of the computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, and so on. Still further, the computing device 600 can include a display 610 (e.g., an OLED display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

As noted above, the computing device 600 also include the storage device 640, which can comprise a single disk or a collection of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of applications executing on the computing device 102, including the image analyzers 110 and the compressor(s) 120.

It is additionally noted that the computing device 600 can include a secure enclave 642 that provides a highly-secure processing/storage area within the computing device 600 that is only accessible to authorized entities. In particular, the secure enclave 642 can establish a sandboxed environment in which unauthorized entities (e.g., user-level applications) are prohibited from accessing the sandboxed environment, while authorized entities (e.g., operating system (OS) daemons) are permitted to access the sandboxed environment. Accordingly, in some embodiments, all or part of the image analyzer 110 can be implemented by the secure enclave 642 to ensure that the data described herein are managed and stored securely and is not accessed by unauthorized entities.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for pre-processing image data for lossless compression of the image data, the method comprising, at a computing device:
    receiving the image data, wherein the image data comprises a model having a mesh, the mesh comprising a plurality of vertices defining a surface, the plurality of vertices comprising a plurality of attribute vectors, and each attribute vector of the plurality of attribute vectors comprising one or more values;
    for each attribute vector of the plurality of attribute vectors:
        de-interleaving one or more respective values into a respective set of bits;
        encoding a first portion of the respective set of bits into a first byte stream comprising (1) a first group of least significant bits, and (2) a sign bit;
        encoding a second portion of the respective set of bits into a second byte stream comprising a second group of most significant bits; and
        for each of the respective set of bits, concatenating the second byte stream after the first byte stream in a single data stream; and
    compressing the single data stream.

2. The method of claim 1, wherein the single data stream is compressed by a Lempel-Ziv-Welch ("LZW") type compressor.

3. The method of claim 1, wherein the one or more values comprise 16-bit floating point numbers including a sign bit, 5-bits of exponent representing range, and 10-bits of significand representing accuracy.

4. The method of claim 1, wherein the plurality of attribute vectors comprise a position vector and a texture vector.

5. The method of claim 1, wherein the single data stream is implemented using at least one buffer.

6. The method of claim 5, wherein compressing the single data stream comprises obtaining the single data stream from the at least one buffer.

7. The method of claim 1, wherein compressing the single data stream generates a compressed image.

8. A non-transitory computer readable storage medium configured to store instructions that, when executed by a processor included in a computing device, cause the computing device to pre-process image data for lossless compression of the image data, by carrying out steps that include:
    receiving the image data, wherein the image data comprises a model having a mesh, the mesh comprising a plurality of vertices defining a surface, the plurality of vertices comprising a plurality of attribute vectors, and each attribute vector of the plurality of attribute vectors comprising one or more values;
    for each attribute vector of the plurality of attribute vectors:
        de-interleaving one or more respective values into a respective set of bits;
        encoding a first portion of the respective set of bits into a first byte stream comprising (1) a first group of least significant bits, and (2) a sign bit;
        encoding a second portion of the respective set of bits into a second byte stream comprising a second group of most significant bits; and
        for each of the respective set of bits, concatenating the second byte stream after the first byte stream in a single data stream; and
    compressing the single data stream.

9. The non-transitory computer readable storage medium of claim 8, wherein the single data stream is compressed by a Lempel-Ziv-Welch ("LZW") type compressor.

10. The non-transitory computer readable storage medium of claim 8, wherein the one or more values comprise 16-bit floating point numbers including a sign bit, 5-bits of exponent representing range, and 10-bits of significand representing accuracy.

11. The non-transitory computer readable storage medium of claim 8, wherein the plurality of attribute vectors comprise a position vector and a texture vector.

12. The non-transitory computer readable storage medium of claim 8, wherein the single data stream is implemented using at least one buffer.

13. The non-transitory computer readable storage medium of claim 12, wherein compressing the single data stream comprises obtaining the single data stream from the at least one buffer.

14. The non-transitory computer readable storage medium of claim 8, wherein compressing the single data stream generates a compressed image.

15. A computing device configured to pre-processing image data for lossless compression of the image data, the computing device comprising a processor configured to cause the computing device to carry out steps that include:
    receiving the image data, wherein the image data comprises a model having a mesh, the mesh comprising a plurality of vertices defining a surface, the plurality of vertices comprising a plurality of attribute vectors, and each attribute vector of the plurality of attribute vectors comprising one or more values;
    for each attribute vector of the plurality of attribute vectors:
        de-interleaving one or more respective values into a respective set of bits;
        encoding a first portion of the respective set of bits into a first byte stream comprising (1) a first group of least significant bits, and (2) a sign bit;

encoding a second portion of the respective set of bits into a second byte stream comprising a second group of most significant bits; and for each of the respective set of bits, concatenating the second byte stream after the first byte stream in a single data stream; and compressing the single data stream.

16. The computing device of claim 15, wherein the single data stream is compressed by a Lempel-Ziv-Welch ("LZW") type compressor.

17. The computing device of claim 15, wherein the one or more values comprise 16-bit floating point numbers including a sign bit, 5-bits of exponent representing range, and 10-bits of significand representing accuracy.

18. The computing device of claim 15, wherein the plurality of attribute vectors comprise a position vector and a texture vector.

19. The computing device of claim 15, wherein the single data stream is implemented using at least one buffer.

20. The computing device of claim 19, wherein compressing the single data stream comprises obtaining the single data stream from the at least one buffer.

\* \* \* \* \*